United States Patent

Strack

[11] Patent Number: 5,810,134
[45] Date of Patent: Sep. 22, 1998

[54] UNDERGROUND ENERGY-SUPPLY TRAIN

[75] Inventor: Manfred Strack, Oberhausen, Germany

[73] Assignee: Ruhrkohle AG, Essen, Germany

[21] Appl. No.: 809,555

[22] PCT Filed: Jun. 27, 1995

[86] PCT No.: PCT/EP95/02495

§ 371 Date: Mar. 3, 1997

§ 102(e) Date: Mar. 3, 1997

[87] PCT Pub. No.: WO96/07814

PCT Pub. Date: Mar. 14, 1996

[30] Foreign Application Priority Data

Sep. 3, 1994 [DE] Germany ............................ 44 31 523.6

[51] Int. Cl.⁶ .................................................. E21F 13/00
[52] U.S. Cl. ..................... 191/2; 104/93; 105/150
[58] Field of Search .................... 191/2, 22 R, 22 C,
191/23 A, 23 R; 105/1 R, 150; 104/93;
299/30, 95; 405/302

[56] References Cited

U.S. PATENT DOCUMENTS

| 4,245,726 | 1/1981 | Kohler | 191/23 A |
|---|---|---|---|
| 4,367,900 | 1/1983 | Trumper | 299/30 |
| 4,451,181 | 5/1984 | Trumper et al. | 405/302 |
| 4,514,011 | 4/1985 | Lodwig et al. | 299/42 |
| 4,564,241 | 1/1986 | Holz et al. | 299/43 |
| 4,700,023 | 10/1987 | Hillmann et al. | 191/12.2 A |
| 4,898,428 | 2/1990 | Weber | 299/30 |
| 5,029,943 | 7/1991 | Merriman | 405/302 |
| 5,297,661 | 3/1994 | Tschurbanoff | 191/38 |

FOREIGN PATENT DOCUMENTS

| 2834245 | 2/1980 | Germany . |
| WO 85/03546 | 8/1985 | WIPO . |

*Primary Examiner*—Mark Tuan Le
*Attorney, Agent, or Firm*—Herbert Dubno; Andrew Wilford

[57] ABSTRACT

An energy supply train for under-ground mining has several universal transport unit frames (UTU frames) (1) interconnected by drawbars and useful as elements of a suspended monorail. At least one of the U68TU frames carries a heavy-duty transformer and at least another UTU frame carries a compact station (4, 5) arranged in a pressure-resistant housing (2, 3) with switchgear (13, 14, 15, 16) for supplying electric energy to underground working means and with electric connection devices (10, 11) at the input and output side of the pressure-resistant housing (2, 3). Each UTU frame (1) carries two compact stations (4, 5) mechanically interconnected by a box (6) and electrically interconnected by electric lines (17) that extend through said box (6) so as to form a single device. The electric connection devices are verified by means of authorised power outlets directly arranged on the walls of the pressure-resistant housings (2, 3) of the compact stations (4, 5).

7 Claims, 1 Drawing Sheet

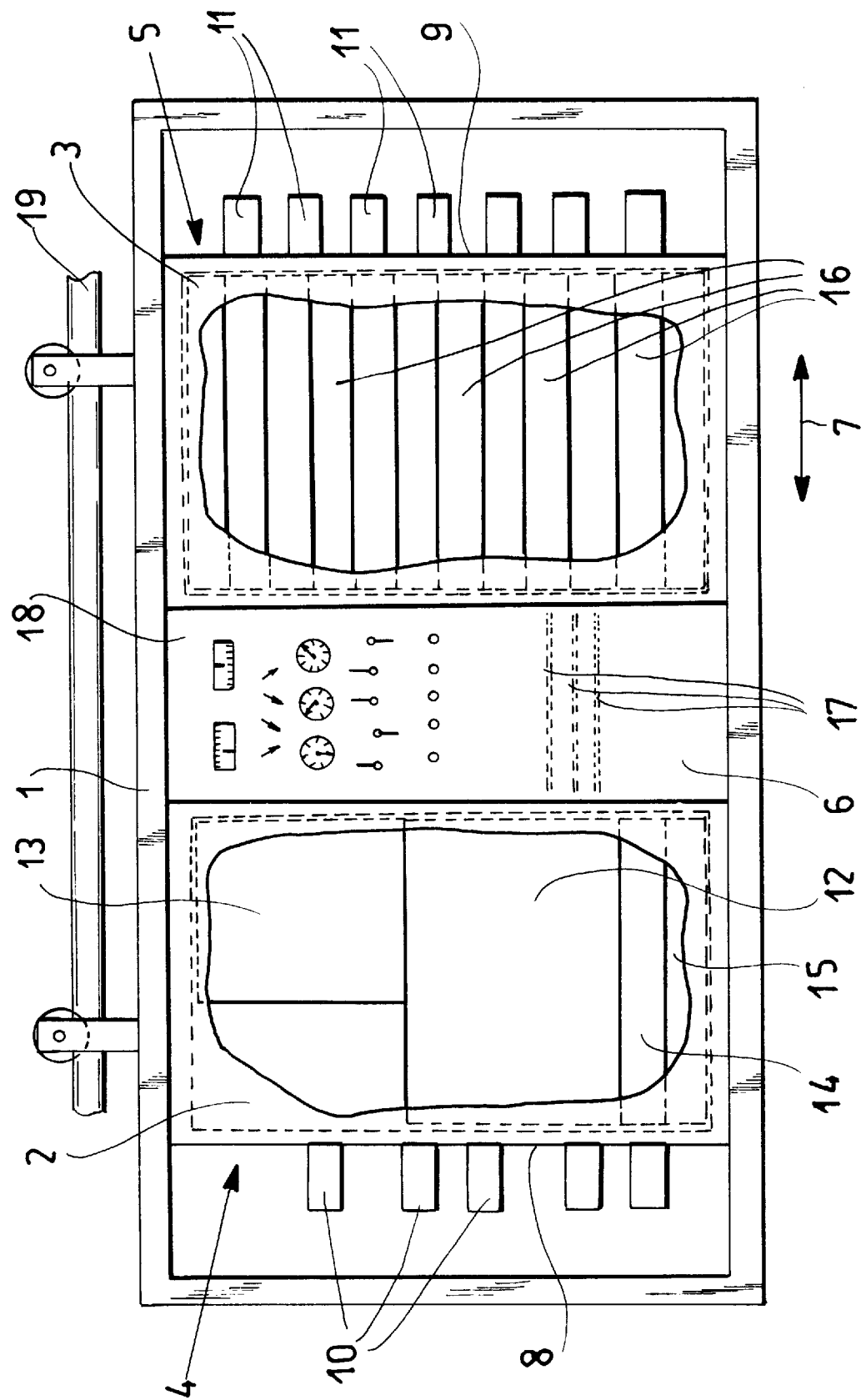

5,810,134

UNDERGROUND ENERGY-SUPPLY TRAIN

CROSS REFERENCE TO RELATED APPLICATIONS

This application is the U.S. national phase of PCT application PCT/EP95/02495 filed Jun. 27, 1995 with a claim to the priority of German application P 44 31 523.6 itself filed Sep. 3, 1994.

FIELD OF THE INVENTION

This invention relates to an underground energy-supply train. More particularly this invention concerns such a supply train with a plurality of universal transport unit frames (UTU frames) interconnected by coupling rods, usable as elements of an overhead monorail, and of which least one carries a high-capacity transformer and at least one other a compact station arranged in a pressure-tight housing and provided with circuitry for supplying underground prime movers with electrical energy and with electrical connections on the input and output sides of the pressure-tight housing.

BACKGROUND OF THE INVENTION

Such underground energy-supply trains are standard in underground mining, in particular in the underground mining of soft coal, namely as a compact station, that is a pressure-tight housing containing circuits and having ends directed in the travel direction of the respective UTU frame and each provided with a connector housing for the electrical inputs and outputs, each such assembly of a compact station and two connector boxes being mounted on its own separate UTU frame.

The assembly comprised of a compact station and connector boxes—according to the known housing type used—has an overall length from 2 to 2.5 m, each connector box being about 0.5 m long. The length of the UTU frame is however 3.3 m to which in use one must add the length of the coupling rods between the UTU frames which are necessary to allow the entire energy-supply train to negotiate curves as an overhead monorail so that each compact station has in the energy-supply train a length of about 4 m. When used underground where there can be considerable machinery, for instance in a plow-type mining operation, several compact stations, which are put together with the necessary high-output transformers on their own UTU frames, are needed to supply electricity to all the equipment so as normally to create at the work site an energy-supply train with two high-output transformers and seven compact stations as well as further on another such with a high-output transformer and five compact stations. This takes up about 60 m of space in the immediate vicinity of the always critical and work-intensive area around the face for parking of the necessary energy-supply trains which takes up much of the already limited space at the face for the various mining, transport, and monitoring stations and greatly reduces access to the various pieces of equipment and feed lines that are supplied by the energy-supply train making repair very difficult. This problem is compounded in that as the trains get longer it becomes more dangerous to work in and around them, especially as they are being brought into and taken out of position.

OBJECT OF THE INVENTION

It is an object of the present invention to substantially reduce the space requirements of underground energy-supply trains, that is to make them shorter without increasing their cross-sectional size while not in any way reducing their functionality or how safe they are.

SUMMARY OF THE INVENTION

This object is attained according to the invention in an underground energy-supply train that comprises a universal transport unit frame adapted to be suspended from and travel along an overhead monorail and carrying a pair of pressure-tight housings separated by a space. Respective compact stations in the pressure-tight housings hold electrical elements including a voltage supply, a circuit breaker, and a plurality of slide-in units. A rigid box fills the space between the housings and connected thereto holds conductors extending through the box between the stations and interconnecting the electrical elements. Plugs and sockets mounted directly on the housings are connected to the electrical elements.

Thus it has proven advantageous when each UTU frame has two compact stations connected mechanically by a box and electrically by conductors extending through this box, and the electrical connections are formed by plugs and sockets of appropriate type mounted directly on walls of the pressure-tight housing because in this manner the length of each energy-supply train in every case is nearly halved without impairing the standard safety requirements since the plugs and sockets provided directly on the walls of the pressure-tight housings of the compact stations of standard type take over the function of the hitherto provided connector blocks fully with respective to safety without taking up any significant space. The mechanical stability of the assembly of two compact stations carried on a single UTU frame is produced advantageously by means of a simple to manufacture connecting box, preferably of sheet steel, which also serves to protect the electrical conductors between the two compact stations, which conductors in this case can without the use of plugs or sockets of any type be conducted hermetically directly through the opposite transverse walls of the two pressure-tight housings.

A particular embodiment of the underground energy-supply train according to the invention has shown itself to be particularly advantageous in that the one compact station with a circuit breaker is provided with at least two protective or lighting inserts and the control-voltage supply for the assembly and the other compact station is provided with further slide-in units since with such an arrangement of the circuitry in the compact stations put together as the assembly there is not only a simple addition of two compact stations but in addition there is an assembly of the functions of different compact stations of the known type which leads to a further reduction of the number—normally pairwise in a UTU frame—of compact stations for an underground energy-supply train. In the case of the above-described plow-type mining operation it is then for example possible in a region of this operation instead of an energy train with two high-output transformers and seven separate compact stations to use only two assemblies each with a pair of compact stations, that is overall only four UTU frames including coupling rods instead of nine UTU frames including coupling rods and in the region of this operation instead of an arrangement of 6 UTU frames (1 high-output transformer and five separate compact station) to use one made up of two UTU frames (1 high-output transformer and one assembly having two compact stations). In this manner instead of an energy train taking up some 60 m of space at the work site the train only takes up some 24 m, is less than half of the normally required space.

In a further embodiment of the energy-supply train according to the invention it is advantageous when the other compact station is provided with twelve further slide-in units since then slide-in units of known type can be used in the pressure-tight housings which substantially simplifies the manufacture of the compact stations and markedly reduces the necessary manufacturing costs.

Preferably according to an embodiment of the energy-supply train in question the box has in addition to the electrical conductors passing through it also a display and service panel since this ensures that in spite of the spatial concentration of the overall energy-supply train along with the original safety standards also the user friendliness of the assembly which up to now—at least partially—was provided by the—otherwise space-wasting—connector boxes is maintained or even improved on.

An advantageous embodiment of the energy-supply train is seen when the high-output transformers are at least 630 kVA transformers since such transformers are standard in underground mining operations, in particular in soft-coal mining, and their use as a result substantially simplifies the construction of the energy-supply train according to the invention and thus also drops the manufacturing costs. The same is true when the plugs and sockets are of standard 1000 V type.

Advantageously according to a further feature of the inventive underground energy-supply train the plugs and sockets of the known type are mounted on end walls of the compact stations extending perpendicular to the travel direction of the UTU frame at respective ends of the assembly because in this manner all the electrical conductors and outputs for the entire assembly are maintained on two compact stations in the region created by the coupling rods in a space between the UTU frames that is normally only used occasionally so they do not interfere with the standard mining, conveying, and monitoring operations.

BRIEF DESCRIPTION OF THE DRAWINGS

An embodiment of an assembly of two compact stations mounted on a single UTU frame of an underground energy-supply train according to the invention is shown in the drawing.

The sole figure is a schematic and partly broken-away top view of an assembly of two compact stations mounted on a single UTU frame.

The drawings specific description shows in a schematic view a known universal transport unit frame (UTU frame) 1 for underground soft-coal mining as an element used on an overhead monorail 19 and in respective pressure-tight housings 2 and 3 compact stations 4 and 5 with circuitry for supplying electrical power to underground equipment. In order to increase the mechanical stability of the shown assembly the two pressure-tight housings 2 and 3 of the compact stations 4 and 5 are solidly connected to each other by a sheet-steel box 6 connecting them. The pressure-tight housings 2 and 3 also carry on their ends turned away from the other compact station 5 and 4 on their end faces 8 and 9 extending perpendicular to the travel direction shown by double-headed arrow 7 and defined by the overhead monorail 19 supporting the UTU frame 1 100 V connectors 10 and 11 of standard type serving as electrical plugs and sockets for the feed lines or outputs of the electrical energy to or from the circuitry in the compact stations 4 and 5.

In the present case which is not obligatory the left compact station 4 with the sockets 10 serves as the input stage of the assembly. It thus holds on one side the control-voltage supply 12 of the assembly and on the other side a circuit breaker 13 as well as, for purposes of optimal use of space, two more protective or light inserts 14 and 15. The other compact station 5 thus holds on the other hand only further, in this nonobligatory case—twelve slide-in units 16 of the known type which are here chosen such that they optimally fill the available space. In addition the pressure-tight housing 3 of the compact station 5 carries all the necessary electrical output elements of the assembly in the form of sockets 11. The electrical connections between the circuits 12 through 15 of the compact station 4 and the further slide-in units 16 or sockets 11 serving as output units or with the compact station 5 are formed by conductors 17 extending through the box 6 which are here shown schematically. Of course some of the sockets 11 are activated directly by the further slide-in units 16 with switching pulses or electrical energy.

In order to increase the ease of servicing the assembly the box 6 in the present nonlimiting case has in addition to the conductors extending through it a display and service panel 18. Its setup can obviously be left up to the user of the above-described underground energy train like the internal construction of the compact stations 4 and 5, the selection and arrangement of the connections 10 and 11, or the actual outer and inner formation of the box 6 without leaving the scope of the patent being sought.

I claim:

1. In combination with an overhead monorail, an underground energy-supply train comprising:

a universal transport unit frame suspended from and travel along the monorail;

a pair of pressure-tight housings separated by a space and provided on the frame;

respective compact stations in the pressure-tight housings, the stations holding electrical elements including a voltage supply, a circuit breaker, and a plurality of slide-in units;

a rigid box filling the space between the housings and connected thereto;

conductors extending through the box between the stations and interconnecting the electrical elements; and plugs and sockets mounted directly on the housings and connected to the electrical elements.

2. The underground energy-supply train defined in claim 1 wherein one of the compact stations includes the voltage supply and a circuit breaker as well as two lighting inserts, the slide-in units being in the other of the compact stations.

3. The underground energy-supply train defined in claim 2 wherein the other compact station has twelve such slide-in units.

4. The underground energy-supply train defined in claim 1 wherein the box is further provided with a display and service panel.

5. The underground energy-supply train defined in claim 1 wherein the voltage supply is a high-output transformer of at least 630 kVA.

6. The underground energy-supply train defined in claim 1 wherein the plugs and sockets are 1000 V structures.

7. The underground energy-supply train defined in claim 1 wherein the housings have end walls directed oppositely away from each other and extending perpendicular to the monorail, the end walls carrying the plugs and sockets.

* * * * *